No. 624,913. Patented May 16, 1899.
C. B. DEMPSTER, F. H. KLINE & R. H. SLEISTER.
PRESS DRILL.
(Application filed Aug. 17, 1897.)
(No Model.) 4 Sheets—Sheet 1.
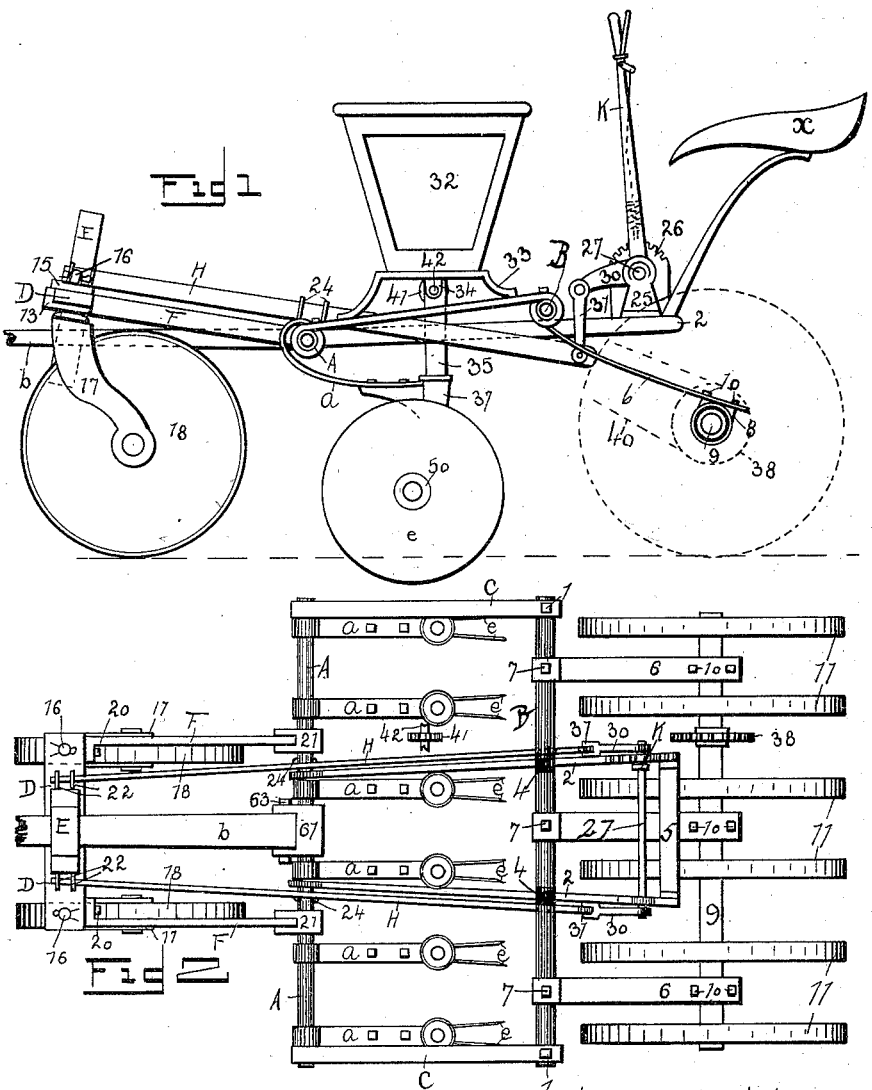
WITNESSES: INVENTORS.
Charles B. Dempster
Frank H. Kline
Robert H. Sleister,
by
ATTORNEY.

No. 624,913. Patented May 16, 1899.
C. B. DEMPSTER, F. H. KLINE & R. H. SLEISTER.
PRESS DRILL.
(Application filed Aug. 17, 1897.)
(No Model.) 4 Sheets—Sheet 2.
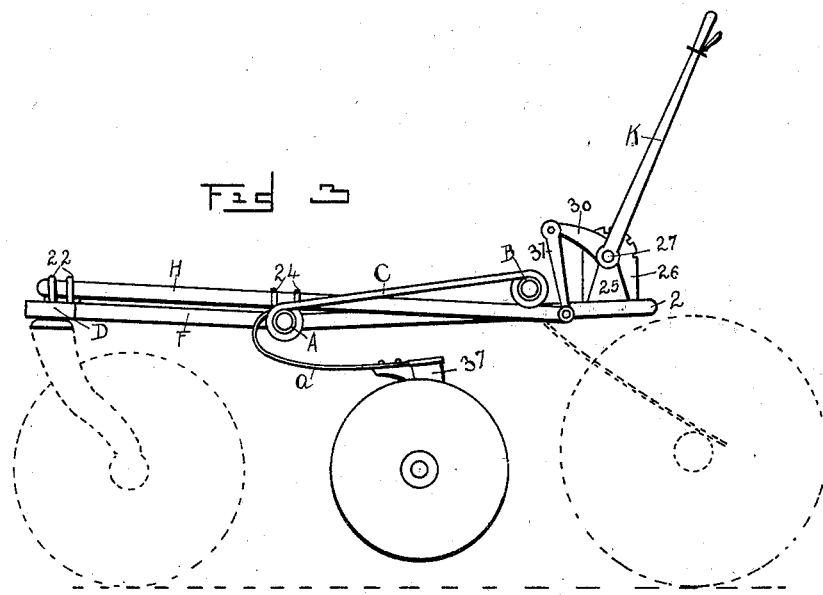
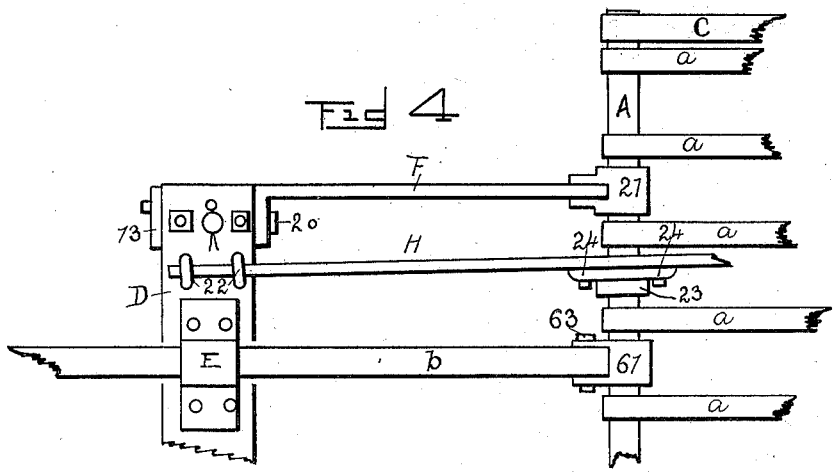
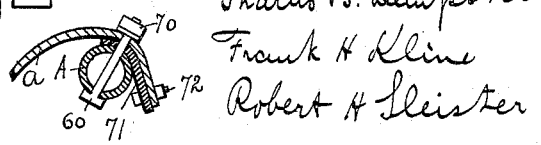
Witnesses
H. W. Pennock,
A. M. Elkjer.
Inventors
Charles B. Dempster
Frank H Kline
Robert H Sleister
By G. W. Sues.
Attorney

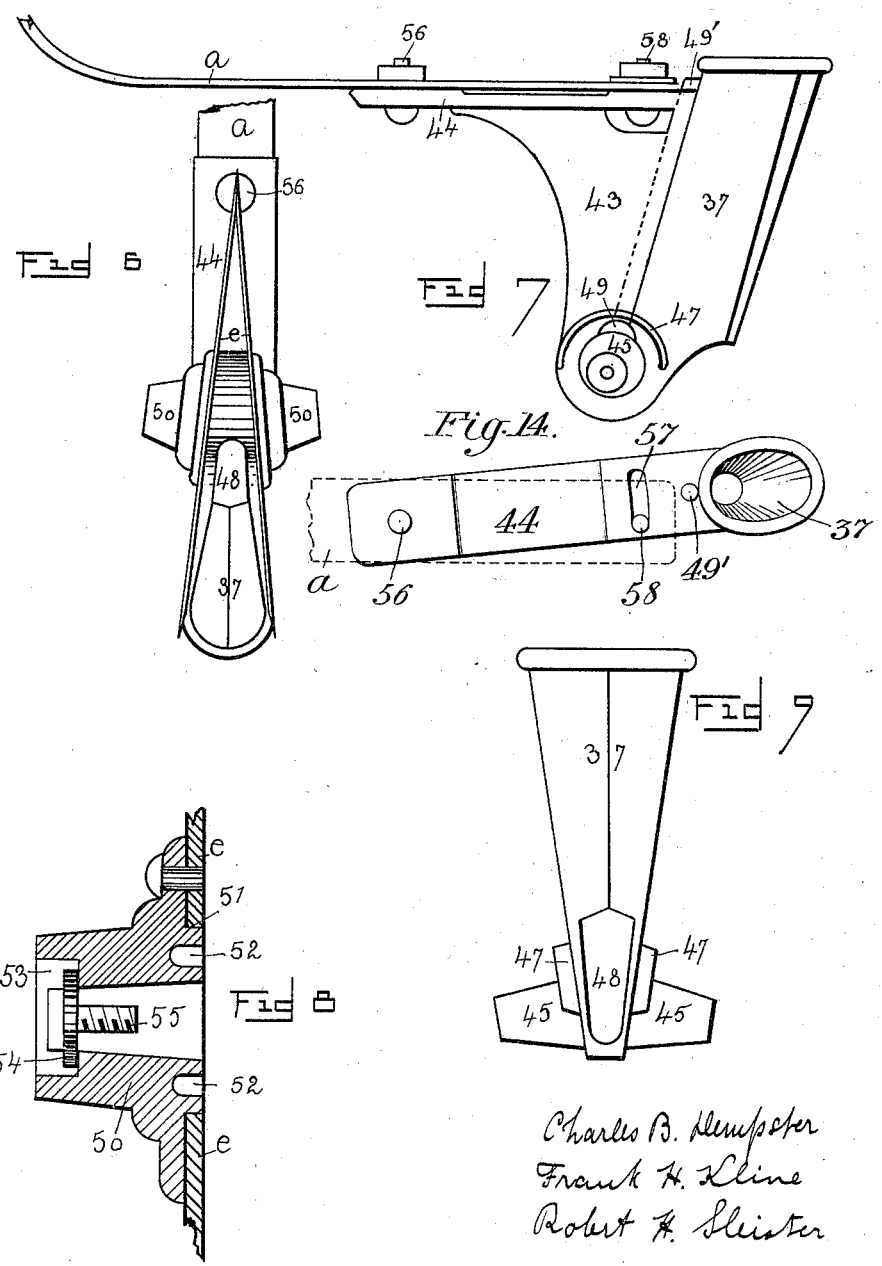

No. 624,913. Patented May 16, 1899.
C. B. DEMPSTER, F. H. KLINE & R. H. SLEISTER.
PRESS DRILL.
(Application filed Aug. 17, 1897.)
(No Model.) 4 Sheets—Sheet 4.
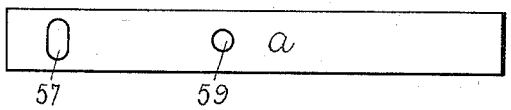
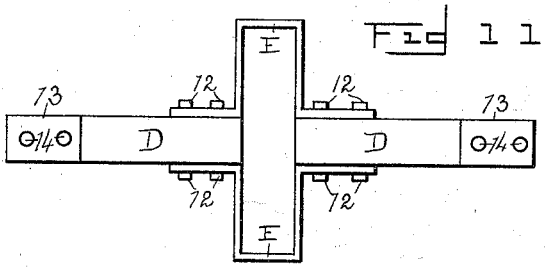
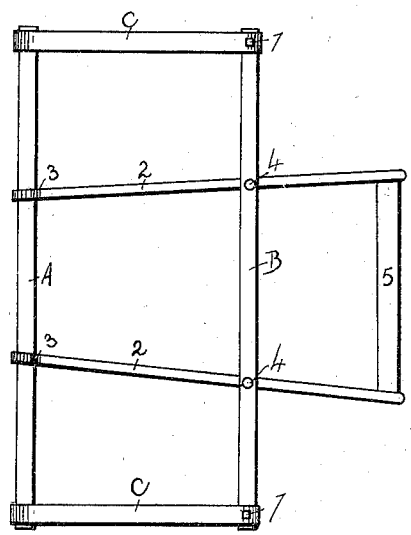

UNITED STATES PATENT OFFICE.

CHARLES B. DEMPSTER, FRANK H. KLINE, AND ROBERT H. SLEISTER, OF BEATRICE, NEBRASKA, ASSIGNORS TO THE DEMPSTER MILL MANUFACTURING COMPANY, OF SAME PLACE.

PRESS-DRILL.

SPECIFICATION forming part of Letters Patent No. 624,913, dated May 16, 1899.

Application filed August 17, 1897. Serial No. 648,593. (No model.)

*To all whom it may concern:*

Be it known that we, CHARLES B. DEMPSTER, FRANK H. KLINE, and ROBERT H. SLEISTER, residing at Beatrice, in the county of Gage and State of Nebraska, have invented certain useful Improvements in Press-Drills; and we do hereby declare that the following is a full, clear, and exact description of the invention, such as will enable others skilled in the art to which it appertains to make and use the same, reference being had to the accompanying drawings, which form a part of this specification.

This invention relates to an improvement in press-drills.

The object of our invention is to provide a press-drill embodying an adjusting mechanism, so that the cutting-disks may be raised or lowered and be adjustably secured, that shall be provided with a forward carriage secured to and forming part of the press-drill proper and which shall be so constructed that all the weight and strain will be taken off of the tongue, the tongue being permitted a free and independent movement, and our invention further embodies a plurality of cutter-disks which are provided with a forwardly-extending stem, by means of which stem said cutter-disks are swiveled to a suitable spring-support and which spring-support, while holding the cutter-disks, allows them a swivel movement, by means of which the cutter-disks are operated in the manner of a drag, adjusting themselves in proper alinement with the machine, as will be described more fully hereinafter. This construction enables the machine being promptly and easily handled in turning around, is of lighter draft, and the cutters can be thrown into working position or out instantly. As the tongue is held perfectly loose within the yoke of the machine, there is no strain on the draft-animals and they will of course work much better when they are relieved of any weight or strain upon their necks.

In the accompanying drawings, Figure 1 shows a side elevation of a press-drill embodying our invention. Fig. 2 shows a top view of our press-drill having portions removed and broken away. Fig. 3 shows a side elevation disclosing the arrangement of the instrumentalities when the cutter-disks are thrown out of working position. Fig. 4 shows an enlarged broken top view of the construction of the forward carriage. Fig. 5 shows a sectional view disclosing the method of securing the spring-holders to the shaft. Fig. 6 shows an enlarged bottom view of one of the cutter-disks as used in our invention. Fig. 7 shows an enlarged side view of one of the boots, showing its connection to the spring-holder to permit a swivel movement. Fig. 8 shows a sectional enlarged detail of one of the caps as used in securing the disks to the boot. Fig. 9 shows a rear view of one of the boots, disclosing the position of the cone-bearings and sand-band as used in our invention. Fig. 10 shows a top view of one of the spring-holders, showing the slot within which the swivel-bolt of the boot works. Fig. 11 shows a front view of the forward carriage, disclosing the arrangement of the yoke. Fig. 12 shows a top view of the main frame, disclosing the arrangement of the rider-bars, which are held by this main frame and which bars support the rider and the main load of the drill. Fig. 13 shows a side elevation of one of the main tilting bars, while Fig. 14 shows a plan view disclosing the position of the boot.

Our invention comprises, essentially, a rectangular frame intermediately positioned between a forward carriage movably secured to said frame and a rear wheel-supported shaft secured to said main frame and an adjusting mechanism to raise and lower said main intermediate frame.

In the furtherance of the object of our invention we provide two main supporting-tubes or cross-bars A and B, as is shown in Figs. 1 and 2 and in detail in Fig. 12. These tubes, if desired, could be solid bars, though for the sake of lightness we prefer using the tubes as shown. These tubes are secured by the end brackets C C, which brackets are of any suitable material and with the bars A and B form the main frame of our invention. These end brackets are fixed to the rear tubes B; but the forward tube A is swiveled and movably held within the brackets C C, so that this forward tube A can be given a rotation.

Extending from the forward tube A rearward are two rider-bars or hounds 2 2, which bars are provided with the eyes 3 3, through which eyes the main bar A passes, while these rider-bars, which project beyond the rear tube B, are secured thereto by means of the bolts 4 4, the bars 2 2 being further secured at the rear by means of the transverse brace-bar 5. By means of the eyes 3 the forward tube A is permitted a rotary movement.

It might here be stated that while we have shown the rider-bars 2 2 as extending below the tube B the same could pass above the tube and be thus secured to the same.

Extending rearwardly from the main tubular support B are a suitable number of holders 6 6, which are secured, by means of the bolts 7, as shown in Fig. 2, to the tube B. These holders are slightly bowed and below are provided with a bearing 8, as is shown more clearly in Fig. 1, and by means of which bearing the rear axle 9 is revolubly held and supported, these bearings 8 being secured to the holders 6 by means of the bolts 10, as is shown in Figs. 1 and 2.

Secured to the rear revolving axle 9 are a suitable number of presser-wheels 11, the number of wheels depending upon the number of grain-boots used in the drill, and which wheels are of a suitable width. By means of these presser-wheels 11 the rear end of the drill is supported. Secured to the forward portion of the main frame of our drill are the bars D D, (shown in detail in Fig. 11,) and which bars are secured by means of the approximately U-shaped yokes E, there being one yoke securing these bars above and another securing these bars below, so as to form a rectangular housing within which the tongue *b* is adapted to work, a front view of the arrangement of these yokes in connection with the bars D D being shown in Fig. 11, the yokes being secured to the bars D by means of the bolts 12. At each end the bars D are reinforced by iron angle-plates 13, which plates are held in position by means of the bolts 14. Secured to the top, at each end, these bars D D are provided with the top plate 15, as is shown in Fig. 1. A bearing is provided which extends through the bars D D and the top and bottom plates 15 and 13, respectively, which bearing is adapted to hold the trunnion 16 of the caster-brackets 17, which brackets are provided with the caster-wheels 18, as is clearly shown in Figs. 1 and 2, and are swiveled within the bars D. Extending from the bars D D are the connecting-rods F F, secured by means of the bolts 20, as is shown more clearly in Fig. 4. At the rear end each of the bars F is provided with the bearing 21, adapted to journal the forward revolving supporting-tube A. From this description it will be seen that the principal construction as far as described of our press-drill embodies a main rectangular frame, which is supported upon the rear by means of the wheels 11 and being supported in front by means of the carriage embodying the yoked bars D D, provided with the swiveled casters 18, and which bars are movably secured to the main frame by means of the connecting-rods F F. As has been described, this structure would be inoperative, as the forward bar A would gravitate toward the earth, which would bring the bars F F and the rider-bars 2 in an approximately vertical position by reason of all of the connections to the bar A being swiveled. However, it is this movement of the main frame in relation to the forward carriage that we utilize in raising and lowering our cutting-disks. This we accomplish in securing to the forward bars D D the tilting bars H H, which bars are securely fastened by means of the staples 22, these tilting bars extending beyond the rear supporting-tube B, as is shown in Figs. 1, 2, and 3. Each tilting bar H is securely shackled to the forward tube A by means of a bearing 23, one of them being shown in detail in Fig. 4, and which bearings are secured to the tilting bars H by means of the straps 24. While we have shown these tilting bars as extending over the top of the bars D D and passing over the forward tube A, the same could extend from the rear edge of the bars D and pass below the forward tube A, if desired. We hold it immaterial how this forward tube A is secured to the tilting bars, these bearings 23 still permitting a rotary movement of the forward tube A.

Secured to the rider-bars or hounds 2 2 is a bearing 25 and another marked 26, the latter being provided with a notched sector adapted to accommodate the pawl of an ordinary adjusting-lever K, and which lever is secured to a shaft 27, held within the bearings 25 and 26, and which shaft at each end is provided with an arm 30, to the forward end of each arm being secured a hanger 31, and these hangers in turn being movably secured below to the tilting bars H, as is shown clearly in Figs. 1 and 2.

The lever K (which is of any suitable structure, so that it may be adjustably secured to the notched sector 26 when in a vertical position) is connected to the tilting bars H, so that the frame of our press drill would be in a proper working position, as indicated in Fig. 1.

Mounted above the tubular supports A and B and between the same is the usual grain-hopper 32 of any approved construction and which is secured to our supporting-frame by suitable brackets 33, and which grain-hopper is provided with the usual shaft 34 to operate the feed mechanisms and from which depend the grain-spouts 35, leading into the grain-boot 37, as is shown clearly in Fig. 1. The hopper mechanism is actuated by a simple gear 38, secured to the rear axle 9 and by means of a chain, which chain passes over a pulley 41 upon the shaft 34, which shaft is supported by means of suitable hangers 42, as is shown in Fig. 1.

It might be here stated that the grain-hopper and dropping mechanism and the method of operating the same forms no special feature in our invention, as we propose using a hopper of any improved construction.

The grain-boots used in conjunction with our drills are provided with a forwardly-extending web 43, which is provided above with the flat plate 44, the boot 37 proper being provided below with two hubs 45, which are so positioned that the disks connected thereto work in juxtaposition, their united edges being forward and at a suitable distance from the ground. At a suitable distance above each hub we provide a semicircular sand-band 47, (shown in Figs. 7 and 9,) which bands project outward a suitable distance, as is shown. The boot proper is provided with the usual chute-opening 48, (as is shown in Figs. 6 and 9,) through which the grain drops into the furrow from the hopper 32. Working upon the hubs 45 are the caps 50, which caps are provided with an angular shoulder 51 of a depth sufficient to accommodate the disk which is to be secured thereto and an annular groove 52, within which the sand-band 47 is adapted to work. These caps are further provided with the opening 53, adapted to receive the washer 54 and bolt 55, which bolt is adapted to work into the hubs, so that these disk-holding caps cannot work off of the hubs. By means of this semicircular sand-band of course the life of the hub and cap is prolonged. Secured to the forward edge of the plate 44 is a bolt 56, by means of which the boot is secured at its forward end to the spring-holder $a$. These spring-holders $a$, there being one for each boot, are provided in the rear with a slot 57, as shown in Fig. 14, through which the bolt 58 passes, the forward bolt 56 passing through an opening 59.

It will be noticed in referring to Fig. 7 that the disks are practically dragged after these spring-holders $a$ and by means of the rear slot 57 are provided a slight lateral movement, so that they readily adjust themselves in being trailed by the machine, and so, also, when any obstruction is encountered by these swivel-disks they are deflected, and so readily pass obstructions, especially if they are but slight.

In order to provide a cheap and economic connection of these spring-holders $a$, we provide the tube A with a series of openings adapted to accommodate the bolts 60, which are provided above with a suitable nut 70 and which are made, after passing through the tube, to hold an approximately J-shaped plate 71, which is provided at the rear with one or more openings to accommodate the bolts 72, which bolts in turn pass through suitable openings within the curved end of the spring-holders $a$, as is shown in Fig. 5.

At a suitable point to the rear the rider-bars 2 are provided with a suitable seat $x$ for the operator, as is shown. Secured within the forward bar D and to the forward tube A is an ordinary tongue $b$, which by means of the keeper 61 is journaled on said tube A. The tongue $b$ is further held between the bars D D and within the yoke-irons E E, as is shown in Figs. 1 and 4, so that the front carriage may rise or fall as the main frame is tilted upward or downward in adjusting the cutters without in any way affecting the tongue $b$, which at its forward end is provided with the usual neck-yoke and whiffletrees, so that the draft-animals may be properly secured. This would be the construction of our invention as far as described.

The operation of our device would be as follows: The tilting main frame, comprising the tubes A and B and the terminal brackets C C, would be supported, first, by means of the rear axle 9, secured to the tubular support B by means of the holders 6, and, secondly, by means of the front carriage, comprising the yoked bars D D, movably secured to the supporting-tube A by means of the bars F F, this front vertically-movable carriage being held in an adjustable and locked condition by means of the tilting bars 2 2, connected to the operating-lever K. Now, for instance, in going to the field the cutting-disks would be thrown out of contact by simply throwing back the operating-lever K, which would carry upward and above the ground the cutter-disks, as is shown in Fig. 3; but as soon as the machine had reached the field and the operation of drilling commenced the lever K would be thrown forward until the disks had properly embedded themselves in the ground, their adjustment in the earth being regulated by the position of the lever K, and in Fig. 1 we have shown the disks a proper distance below the surface of the earth. As the drill advanced the seeding mechanism would be properly operated, so that the seed would be carried through the chute and boot into the furrow created by means of the cutting-disks, and this seed-laden furrow would next be closed by means of the covering-wheels 11, which pass within the path of the seeding-disks. Any irregularity encountered by the cutting-disks would be evaded by means of the swivel movement of these disks, and the disks could be raised and lowered without in any way bringing the strain upon the necks of the draft-animals, which would be secured to the tongue $b$, which tongue is permitted a free vertical movement independent of the drill by virtue of being permitted to work within the yoke. By means of the lever K the main frame of course can be inclined and raised upward and downward and locked at any suitable angle, and this adjustment, which carries upward or downward the hounds 2, has a tendency, first, to raise the main tube A, and, secondly, to slightly twist or rotate the same, so that the cutter-disks pass into and out of the earth in the path of an arc. The caster-wheels 18 below the forward portion of the frame of course readily adjust themselves, as they are also positioned so that the axis of the wheels 18 come a suitable distance to the rear of the trunnion 16, so that the standard can be readily turned around, in which instance of course the cutter-disks are thrown out of engagement with the earth. By means of the tilting frame a free and nice adjustment of the cutter-disks can also be obtained, as they can be depressed at any suitable point and held there, as the operation of adjusting this tilting frame is positive.

The method of securing the holders 6 to the tube B is similar to that shown in Fig. 5 and described in connection with the method of securing the spring-holders $a$ to the tube A by means of suitable bolts and an approximately J-shaped plate 71.

The device is light and simple of construction and operation. Seed is planted at a proper depth and well covered. There are no crowded roots. The machine cuts through the trash instead of riding over it. There is no strain on tongue or team in turning or guiding the machine. There is no weight on the necks of the team, saving them from sore necks. The depth of cutters can be regulated at will of operator. The cutters throw into or out of ground easily. The machine can be turned squarely around without extra effort and the powerful presser-wheels complete the thorough work of the cutters.

Having thus described our said invention, what we claim as new, and desire to secure by United States Letters Patent, is—

1. The combination with a main adjustable frame of a movable forward carriage secured to said frame, a rear wheeled support secured to said frame, and mechanism to raise and lower said main frame.

2. The combination with an adjustable frame, a rear wheeled support secured to said frame, a forward carriage movably secured to said adjustable frame, and a tongue pivotally secured to said frame.

3. The combination with a main movable frame, of a rear wheeled support fixed to said movable frame, a forward wheeled carriage movably secured to said frame, mechanism to raise and lower said frame, and a tongue movably secured to said tilting frame.

4. The combination with an adjustable frame, of a wheeled support fixed to the rear of said frame, a wheeled carriage movably secured to the forward end of said adjustable frame, an operating-bar extending from said forward carriage, and an adjusting mechanism secured to said frame.

5. The combination with a main adjustable frame, of a wheeled support fixed to the rear of said frame, a wheeled carriage movably secured to the forward end of said frame, an operating-bar extending from said forward carriage, an adjusting mechanism secured to said frame, and to said operating-bar, so that said frame can be adjustably secured, and seed-boots secured to the forward end of said adjustable frame.

6. The combination with a main frame, of a plurality of wheels fixed to the rear of said main frame, a wheeled carriage movably secured to the forward end of said main frame, adjusting mechanism to raise and lower said main frame, and a plurality of seed-boots provided with cutter-disks secured to the forward edge of said main frame and in alinement with said plurality of wheels.

7. The combination with an adjustable main frame, of a plurality of presser-wheels fixed to the rear of said frame, a wheeled frame hinged to the forward edge of said main frame, mechanism to raise and lower said frame, a plurality of holders extending from the forward edge of said main frame, and a plurality of seed-boots swiveled at their forward ends to said holders.

8. The combination with a main frame, of a plurality of presser-wheels secured to the rear end of said frame, a forward wheeled carriage movably secured at its rear end to the forward end of said frame, said carriage and main frame working in the manner of a hinge, mechanism to raise and lower said main frame and connected carriage at their union, a plurality of seed-boots swiveled to the forward end of said main frame, and two disks held in juxtaposition at a point a suitable distance below the ground secured to said boots, substantially as and for the purpose set forth.

9. The combination with a main frame of a wheeled support secured to the rear end of said main frame, a wheeled yoked carriage movably secured to the forward edge of said frame, a tongue pivotally secured to the forward edge of said main frame, said tongue working within said yoke, substantially as and for the purpose set forth.

10. The combination with a main frame, of a wheeled support secured to the rear edge of said frame, a wheeled carriage movably secured to the forward edge of said frame, mechanism to raise and lower said main frame, seed-boots swiveled to the forward end of said main frame, a seed-reservoir above and secured to said main frame, connections between said boots and reservoir, and cutter-disks held in juxtaposition, their uniting-points being a suitable distance above the earth, and secured to said boot, all arranged substantially as and for the purpose set forth.

11. In a grain-boot, provided with the usual chute having a lower opening, of two hubs secured to said boot upon opposite sides and forward of said chute-opening, said hubs inclining forward and slightly downward, semicircular sand-bands positioned above said hubs, a web extending forward from said boot and upward from said hubs, a top plate forming a part of said web, a slot within said top plate approximately above said hubs, and an opening within said top plate in advance of said slot, as and for the purpose set forth.

12. The combination in a seed-drill of the following instrumentalities to wit: a main supporting-frame, a movable forward carriage pivotally secured to said supporting-frame, a rear wheeled support secured to said main supporting-frame, mechanism to raise and lower said main supporting-frame, a plurality of seed-boots secured to said main supporting-frame, cutter-disks secured to said boots, a reservoir supported by said main frame, grain-ducts extending from said reservoirs to said seed-boots, presser-wheels secured to said rear wheeled support and said presser-wheels being positioned in line with said seed-boots, and a draft-tongue pivotally secured to said main supporting-frame, working independent of said forward carriage, all arranged substantially as and for the purpose set forth.

In testimony whereof we affix our signatures in presence of two witnesses.

CHARLES B. DEMPSTER.
FRANK H. KLINE.
ROBERT H. SLEISTER.

Witnesses:
D. W. CARRE,
H. W. SCHAFER.